BEST AVAILABLE COPY

DEFENSIVE PUBLICATION

T856,00

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 5, 1968

856 O.G. 3

646,766

ADAMANTANE DERIVATIVES

Heinz Fritz Reinhardt, Claymont, Del., assignor to E. I. du Pont de Nemours and Company, Wilmington, Del., a corporation of Delaware Continuation-in-part of application Ser. No. 106,172, Apr. 28, 1961. Division of application Ser. No. 265,062, Mar. 14, 1963. This application Feb. 8, 1967. Published Nov. 5, 1968

Class 260—75

No Drawing. 38 Pages Specification

A new class of synthetic polymers are prepared from monomeric compounds having the structural formula: R—A—$(X)_m$—A—R′ in which A is a 1,3-adamantylene group (a 1,3-radical of adamantane(tricyclo[3.3.1.$1^{3,7}$] decane)) which has the formula

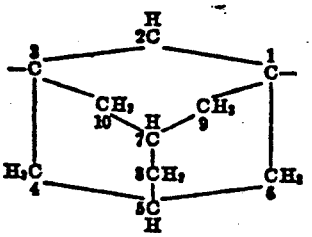

and X, R and R′ are substituents capable of combining with a tertiary alkyl carbon atom (i.e., t-butyl radical) to form stable compounds, X being a divalent radical. R and R′ may be the same or different and may be hydrogen or a monovalent radical, *m* is an integer equal to 0 or 1, and at least one of R and R′ has a molecular weight greater than six when *m* is zero.

When *m* in the above structural formula is zero, the monomers are designated as 3,3′-derivatives of -1,1′-biadamantane and are useful in forming polyamides, polyethers, and polyesters containing adamantylene radicals as well as polymers containing adamantylene groups in the backbone of the polymer chain.

When *m* is in the above structural formula, the monomers are bis(adamantyl) compounds and are useful in preparing polymers in which the backbone of the polymer contains spaced adamantylene radicals.